1. United States Patent [19]

Spridco

[11] Patent Number: 4,782,570
[45] Date of Patent: Nov. 8, 1988

[54] FABRICATION AND ASSEMBLY OF METAL CATALYTIC CONVERTER CATALYST SUBSTRATE

[75] Inventor: Jack P. Spridco, New Berlin, Wis.

[73] Assignee: General Motors Corporation, Detroit, Mich.

[21] Appl. No.: 121,404

[22] Filed: Nov. 16, 1987

[51] Int. Cl.$^4$ .................. B21D 53/00; B23P 15/00
[52] U.S. Cl. .................... 29/157 R; 29/430
[58] Field of Search ............ 29/157 R, 422, 430, 29/457; 922/180

[56] References Cited

U.S. PATENT DOCUMENTS

| 4,020,539 | 5/1977 | Vroman | 29/157 R |
| 4,335,078 | 6/1982 | Ushijima et al. | 29/157 R |
| 4,347,219 | 8/1982 | Noritake et al. | 29/157 R |
| 4,521,947 | 6/1985 | Nonnenmann et al. | 29/157 R |
| 4,598,063 | 7/1986 | Retallick | 29/157 R |
| 4,667,386 | 5/1987 | Enomoto et al. | 29/157 R |
| 4,711,009 | 12/1987 | Cornelison et al. | 29/157 R |
| 4,719,680 | 1/1988 | Cyron | 29/157 R |
| 4,741,082 | 5/1988 | Kanniainen et al. | 29/157 R |

FOREIGN PATENT DOCUMENTS 2400443 10/1975 Fed. Rep. of Germany .... 29/157 R

Primary Examiner—Howard N. Goldberg
Assistant Examiner—Irene Cuda
Attorney, Agent, or Firm—R. L. Phillips

[57] ABSTRACT

Method of fabricating and assembling metal catalytic converter catalyst substrates by sequentially laying strips of foil of predetermined widths onto a strip of sheet metal as the latter is formed into a single seam tube about the layers of foil to contain and restrain same, seam welding the tube along its length, and cross cutting the tube and contained layers of foil into predetermined lengths to form catalyst substrate units.

2 Claims, 1 Drawing Sheet

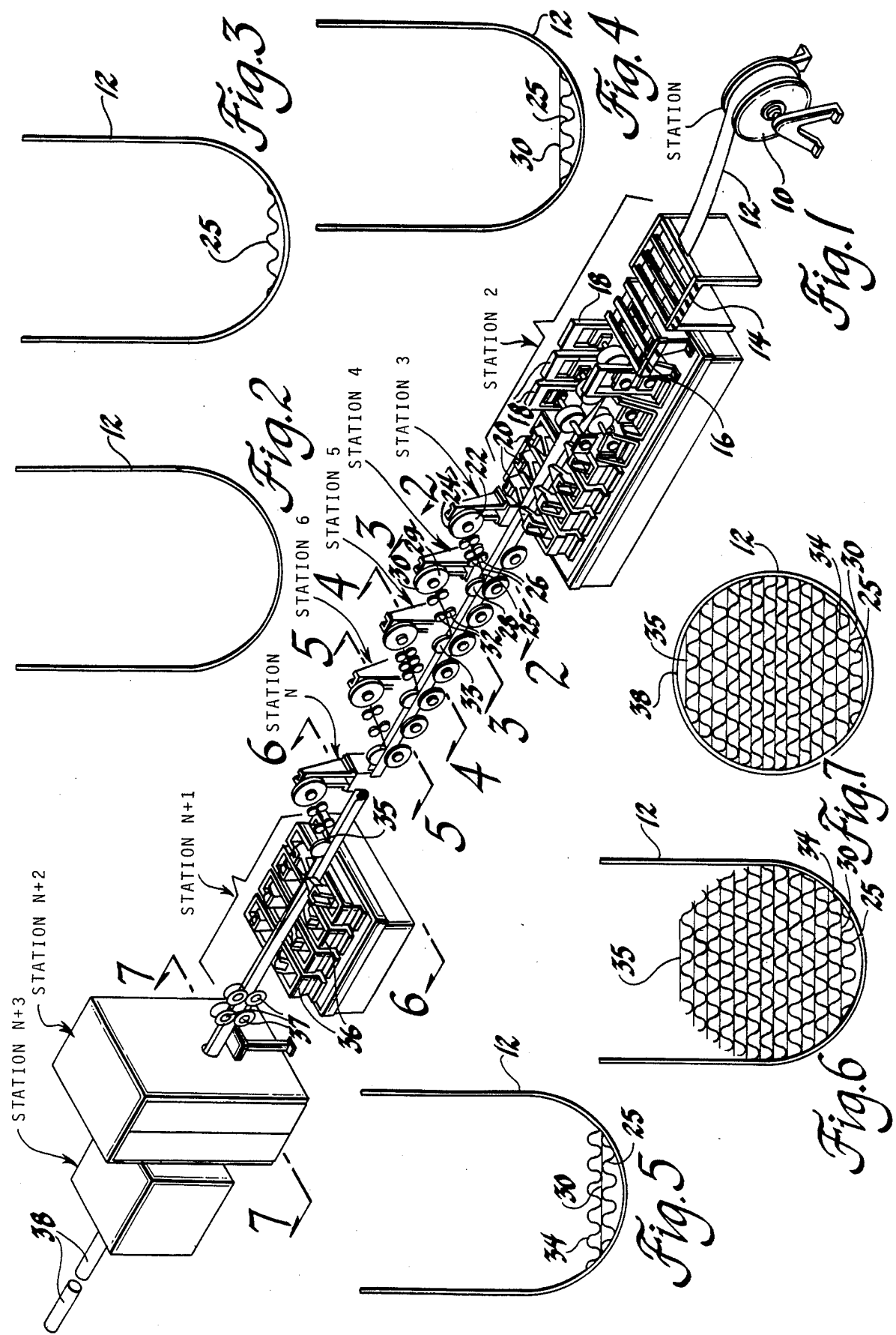

FABRICATION AND ASSEMBLY OF METAL CATALYTIC CONVERTER CATALYST SUBSTRATE

TECHNICAL FIELD

This invention relates to the fabrication and assembly of metal catalytic converter catalyst substrates and more particularly to the fabrication and assembly of layers of metal foil in a tubular metal shell to form a catalyst substrate.

BACKGROUND OF THE INVENTION

In the fabrication and assembly of metal catalytic converter catalyst substrates, it has been proposed to either coil, fold or stack strips or sheets of corrugated metal foil or corrugated metal foil and flat metal foil to form the desired substrate crosssection which may be round, oval or polygon shaped. In either case, the foil is typically assembled in a preformed sheet metal shell housing one at a time with the layers of foil fixed relative to each other and to the housing by compressing loading and/or bonding (e.g. welding) and/or physical restraints (e.g. end rings and pins). While such prior fabrication and assembly methods have proven generally satisfactory, they are substantially limited in production rate and would require a plurality of assembly lines for motor vehicle usage where yearly production requirements numbers in the tens of millions of units.

SUMMARY OF THE PRESENT INVENTION

The present invention provides far faster fabrication and assembly with a continuous line assembly technique that is basically quite simple. According to the present invention, a strip of flat sheet metal stock of predetermined width is roll formed into a concave shape conforming to approximately one-half that of the final desired cross-sectional shape of the housing which it is to form. The now concave shaped sheet metal stock is then advanced past a plurality of stations where strips of metal foil stock of predetermined width are then sequentially layed onto the concave sheet metal strip so as to assembly thereon the desired cross-sectional profile of the metal foil substrate. The strip of sheet metal is then further roll formed into the final desired cross-sectional tubular profile about the layers of foil to enclose and compress same together and then seam welded along the length thereof to form a leak tight shell. Following this operation, the tubular shell containing the metal foil is then cross-cut into primary lengths from which the desired lengths of catalyst substrate assemblies are eventually cut to the desired length for incorporation in a catalytic converter assembly as further discussed later.

Thus, the catalyst substrate assemblies are formed on a continuous line processing basis after the manner of a tube mill and thus at a speed many times faster than that of the previous methods of coiling, stacking and folding. For example, it is estimated that by using the above fabrication and assembly method, a typical monolith substrate with a length of six inches could be produced on a single assembly line at the rate of approximately 60 million units per year.

An object of the present invention is to provide a new and improved method of fabricating and assembling metal catalytic converter catalyst substrates.

Another object is to form a tubular shell from flat stock while sequentially laying strips of corrugated or flat and corrugated metal foil therein so as to produce a metal monolith substrate of predetermined cross-sectional outline which may be either round, oval or some polygon shape.

Another object is to roll form a strip of sheet metal stock into a partial tubular shape of round, oval or polygon cross-sectional outline while sequentially laying strips of metal foil stock of predetermined widths on the sheet metal stock whereafter the sheet metal stock is further roll formed into the final desired cross sectional shape compressing the metal foil layers and then seam welded and the tubular foil filled assembly eventually cross-cut to the desired substrate length.

These and other objects, advantages and features of the present invention will become more apparent from the following description and drawing in which:

FIG. 1 is a pictorial view of the preferred apparatus for carrying out the fabrication and assembly of a catalyst substrate according to the present invention.

FIGS. 2-7 are sequential views taken along the lines 2—2, 3—3, 4—4, 5—5, 6—6 and 7—7 respectively in FIG. 1 illustrating sequential operations in the fabrication and assembly of the catalyst substrate.

Referring to FIG. 1, the catalyst substrate fabrication and assembly apparatus thereshown comprises a plurality of stations starting with Station #1 which has a coil reel 10 holding a strip of stainless steel 12 that is used to form the shell of what may be referred to as a single seam version of the metal monolith substrate assembly disclosed in U.S. Pat. No. 4,559,205 assigned to the assignee of this invention and which is hereby incorporated by reference. To this end, the stainless stock is pre-slit to the width required to produce the perimeter shell which will match the cross-sectional shape or outline desired of the foil layers and may be either circular as shown or oval or of some polygon shape. In the description that follows, it will be seen that the widths of the foil are made equal to the various chordal dimensions of the circular substrate shape shown and thus vary in equal steps and it will be understood that the foil width dimensions will vary differently according to the cross-sectional substrate profile desired and not at all in the case of a square or rectangular shape. The strip stock 12 from Station 1 is fed to a roll forming station 2 which like in a conventional tube mill comprises an edge conditioner 14, entry guide 16, a plurality of break down roller passes 18, and a plurality of cluster units 20 which all cooperate to form the stainless steel strip stock into a preliminary concave or U-shape as shown in FIG. 2 that is necessay to generate the final closed form.

The U-shaped strip stock exiting from Station 2 is delivered to a Station 3 which has a coil reel 22 of flat oxidized stainless steel foil 24 that has been pre-slit to a width that is required for the first substrate layer. The foil 24 unwinds from the reel 22 and enters into conventional corrugating roll forming substation 26 which generate a corrugated pattern in the foil that is parallel to the direction of foil travel. As the thus produced corrugated foil 25 exits the corrugating rollers, it is guided by a final roller 28 onto the bottom of the thus far formed U-shaped shell as seen in FIG. 3 as it advances along the line toward the next Station 4.

At Station 4, there is a reel 29 holding another coil 30 of the oxidized stainless steel foil but which has been pre-slit to the narrower width required for a second layer. This foil unwinds from the reel and is guided by opposed rollers 32 and a final roller 33 onto the top of the first layer of foil 25 as seen in FIG. 4. This foil may be flat as shown or herringbone corrugated depending on the type of substrate desired.

From Station 4, the partially formed shell now containing two laye foil is passed onto Stations 5 through Station N. stations are duplicates of Stations 3 and 4 with each station laying down a layer of foil of the prope width and surface configuration (see the next layer 34 which is corrugated as seen in FIG. 5) so as to build up the stack to the desired form. Station N is defined a the last station laying down the last layer 35 of the foil stack which may be flat as shown in FIG. 6. The unconstrained stack height of the substrate resulting from the addition of the Nth layer of foil is sufficient to furnish adequate compressive pressure when constrained in the finished substrate after the manner of that disclosed in the aforementioned U.S. Pat. No. 4,559,205.

From the N Station, the partially formed shell now containing all the required layers of foil is advanced to Station N+1. This station comprises clusters 36 and forming rollers 37 that complete roll forming the shell to the desired shape, which in this case is round. This completely encloses the foil layers with a shell that constrains the foil layers and provides the compressive loading on the substrate like in the aforementioned U.S. Pat. No. 4,559,205.

Thereafter, the thus closed tubular shell containing the layered foil is advanced onto Station N+2 which has a conventional high frequency AC or DC welding supply and welding electrodes that seam weld the single tube seam 38 completing a leak tight shell.

From the seam welding station, the thus closed and welded shell 12 containing the compressed foil layers is advanced onto the Station N+3 which has a conventional flying cutoff system utilizing a shear. This station cuts the emerging metal honeycomb structure into prescribed lengths (e.g. 10 to 20 foot lengths) which may be referred to as logs as it is intended that such be subsequently recut in a burrless manner into the proper monolith substrate lengths such as by laser cutting, high speed abrasive cutting, water jet cutting or possible double action shear cutting. After the logs are recut into the proper substrate lengths, subsequent conventional operations such as cleaning, coating and calcining are completed. Following these operations, two funnel-shaped parts may be welded to the ends of the shell 12 to form an inlet and outlet to complete the catalytic converter assembly as disclosed in the aforementioned U.S. Pat. No. 4,559,205. These end bells provide end support to the substrate and along with the compression of the substrate by the shell assure the structural integrity of the substrate as disclosed in the afore-mentioned U.S. Pat. No. 4,559,205.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:, 1. A method of fabricating and assembling a metal catalytic converter catalyst substrate of predetermined cross-sectional profile comprised of a tubular sheet metal shell containing layers of metal foil, said method comprising the steps of (1) initially forming a strip of sheet metal stock of predetermined width into a concave shape (2) sequentially laying strips of metal foil of predetermined widths onto the concave sheet metal strip so as to assemble layers of foil thereon conforming to said predetermined profile, (3) finally forming the strip of sheet metal stock about the layers of foil into a single seam tube conforming to said predetermined profile, (4) sealingly joining the seam of the tube along the length thereof, and (5) cross-cutting the tube with the layers of foil therein to predetermined lengths so as to form catalyst substrate units therefrom.

2. A method of fabricating and assembling a metal catalytic converter catalyst substrate of predetermined cross-sectional profile comprised of a tubular sheet metal shell containing layers of metal foil, said method comprising the steps of (1) initially roll forming a strip of sheet metal stock of predetermined width into a concave shape conforming along the bottom thereof to approximately one-half that of said predetermined profile (2) alternately corrugating and sequentially laying strips of metal foil stock of predetermined widths onto the concave sheet metal strip so as to assemble layers of foil thereon conforming to said predetermined profile, (3) finally forming the strip of sheet metal stock into a single seam tube extending about and compressing the layers of metal foil, (4) welding the seam of the tube along the length thereof, and (5) cross-cutting the seam welded tube with the layers of foil therein to predetermined lengths so as to form catalyst substrate units therefrom.

* * * * *